(12) United States Patent
Amamori

(10) Patent No.: US 6,971,664 B2
(45) Date of Patent: Dec. 6, 2005

(54) PASSENGER-SIDE AIRBAG APPARATUS

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 45 days.

(21) Appl. No.: 10/281,164

(22) Filed: Oct. 28, 2002

(65) Prior Publication Data

US 2003/0094794 A1  May 22, 2003

(30) Foreign Application Priority Data

Nov. 22, 2001  (JP) .............................. 2001-357914

(51) Int. Cl.[7] .............................................. B60R 21/24
(52) U.S. Cl. ................................... 280/729; 280/743.1
(58) Field of Search ............................. 28/729, 743.1

(56) References Cited

U.S. PATENT DOCUMENTS

| | | | |
|---|---|---|---|
| 3,642,303 A | 2/1972 | Irish et al. | |
| 5,310,214 A | 5/1994 | Cuevas | |
| 5,513,877 A | 5/1996 | Mac Brien et al. | |
| 5,529,337 A | 6/1996 | Takeda et al. | |
| 5,577,765 A | 11/1996 | Takeda et al. | |
| 5,697,640 A * | 12/1997 | Lalonde | 280/743.1 |
| 6,308,983 B1 | 10/2001 | Sinnhuber | |
| 2002/0005633 A1 | 1/2002 | Amamori | |

FOREIGN PATENT DOCUMENTS

| | | |
|---|---|---|
| DE | 198 60 823 | 7/2000 |
| JP | 1-150157 | 10/1989 |
| JP | 4-193644 | 7/1992 |
| JP | 6-344843 | 12/1994 |
| JP | 8-80797 | 3/1996 |
| JP | 2528555 | 12/1996 |
| JP | 9-188216 | 7/1997 |
| JP | 9-488 | 9/1997 |
| JP | 10-1008 | 1/1998 |
| JP | 2000-43663 | 2/2000 |
| JP | 2000-85516 | 3/2000 |

* cited by examiner

*Primary Examiner*—Eric Culbreth
(74) *Attorney, Agent, or Firm*—Manabu Kanesaka

(57) ABSTRACT

An airbag has the first bag expanding from an upper portion of an instrument panel toward a passenger, and the second bag disposed at a front part of the first bag. The first and second bags are respectively formed of two panels. The first bag has a length smaller than that of the second bag in the lateral width direction. When the second bag expands, the second bag abuts against a windshield or a ceiling of a passenger compartment, and contacts the upper body of the passenger for supporting.

9 Claims, 9 Drawing Sheets

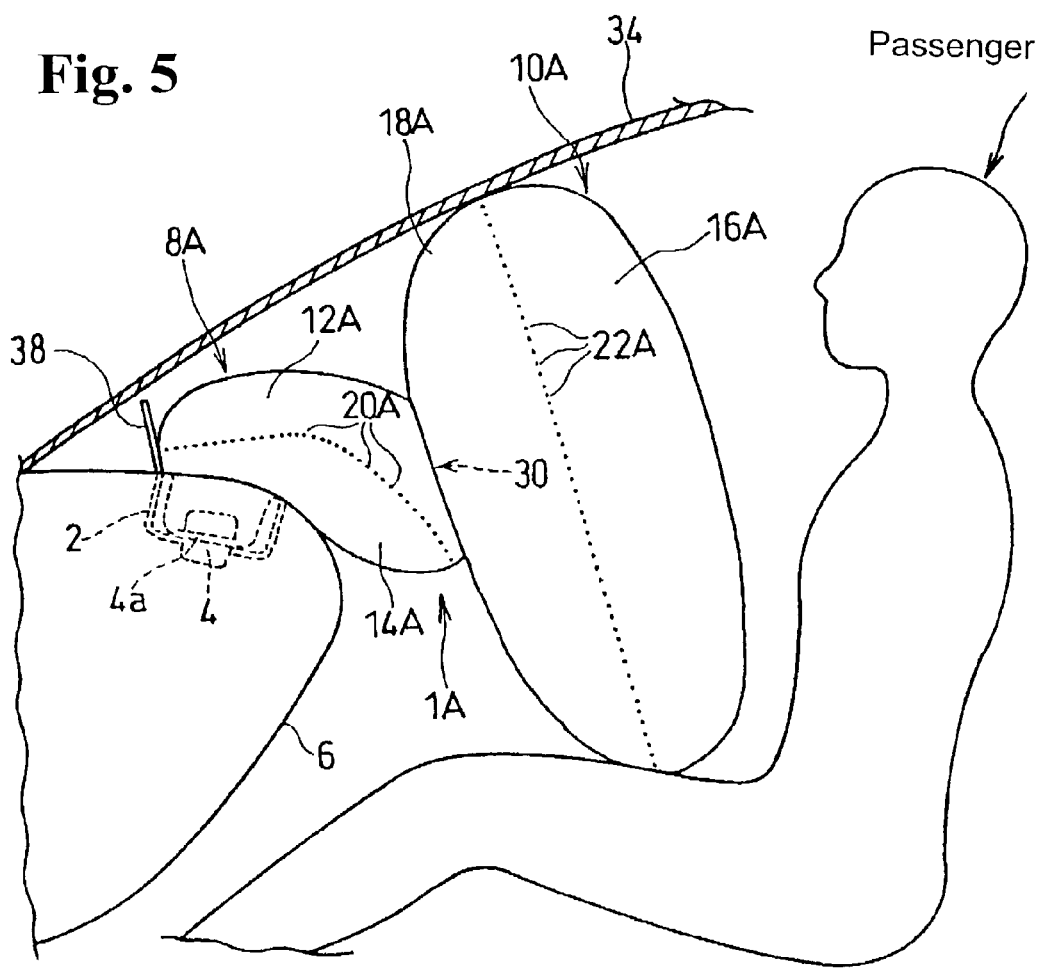

PASSENGER-SIDE AIRBAG APPARATUS

BACKGROUND OF THE INVENTION AND RELATED ART STATEMENT

The present invention relates to a passenger-side airbag apparatus installed in an instrument panel of a vehicle. In an emergency such as a car crash, the passenger-side airbag expands into a space between a windshield of the vehicle and a passenger sitting in a front passenger seat of the vehicle so as to protect the passenger.

A passenger-side airbag apparatus is generally installed in an instrument panel of a vehicle in a state such that a passenger-side airbag is housed in a container-shape retainer and covered by a lid fixed to the retainer. The retainer has an inflator therein for producing gas to inflate the airbag.

In an emergency such as a car crash, the passenger-side airbag is caused to inflate by the gas flowing from the inflator, pushes the lid out, and expands into a passenger compartment so as to receive a passenger who suddenly moves forward by an impact of the car crash or the like.

FIG. 8 is a sectional view of a conventional passenger-side airbag apparatus when a passenger-side airbag 100 expands.

A passenger-side airbag 100 has an approximate cone shape tapered toward a rear side (shown in the left side in FIG. 8, and hereinafter, shown in the same manner) in an expanded state. The passenger-side airbag 100 has a front part (shown in the right side in FIG. 8, and hereinafter, shown in the same manner) as a passenger surface 102, which faces the passenger and has a sufficient area so as to receive the passenger when the airbag 100 expands in an emergency such as a car crash. Also, when the airbag is expanded, the airbag 100 having an upper part (shown in an upper side in FIG. 8, and hereinafter, shown in the same manner) serves as a windshield surface 104 that faces a windshield 122 installed at a front portion of a car body.

The airbag 100 has an opening 106 at a rear part thereof, a periphery of which is connected to a periphery of an opening disposed at a front part of a container-shape retainer 110. The retainer 110 has an inflator 112 therein, and the gas ejected from the inflator 112 is introduced into the airbag 100 through the opening. The airbag 100 is housed in the retainer 110 in a folded state. Then, a lid 114 is fixed to the opening of the retainer 110 and the retainer 110 is installed in an instrument panel 120 of the vehicle.

In an emergency such as a car crash, the gas ejected from the actuated inflator 112 inflates the airbag 100 to push the lid 114 out and expands in a passenger compartment.

The airbag 100 discharged into the passenger compartment expands into the space between the windshield 122 and the passenger. The passenger surface 102 develops so as to face the passenger for receiving the passenger, and the windshield surface 104 develops along the windshield 122 so as to face the windshield 122. When the passenger hits the passenger surface 102 and strongly presses the airbag 100, the windshield surface 104 presses the windshield 122 and is thus securely supported by the windshield so that the airbag 100 reliably receives the passenger.

The airbag 100 has a structure in which three or more panels forming the windshield surface 104, the passenger surface 102, the lower surface facing the instrument panel 120, and the right and left surfaces are three-dimensionally sewed, so that the airbag 100 has an approximate cone shape and the upper surface thereof faces the windshield 122 when it expands. Due to this complicated structure, the airbag 100 can be considered as a relatively high-grade type. On the other hand, an airbag 130 shown in FIG. 9 is formed of only two panels, and has been in the market as a passenger-side airbag of a relatively low-grade type.

The airbag 130 has two panels, i.e. an upper panel 132 and a lower panel 134 respectively as an upper half and a lower half of the airbag when it expands, so as to form a bag shape by overlapping these panels with each other and stitching their peripheries together. The lower panel 134 has an opening 136 at a rear part thereof for introducing the gas from the inflator 112 into the airbag 130.

The airbag 130 is connected to the retainer 110 by attaching a periphery of the opening 136 formed at the rear part of the lower panel 134 to a periphery of the opening formed at the front part of the retainer 110. Since the other structural features of the airbag apparatus having the airbag 130 are the same as those of the above-described airbag apparatus shown in FIG. 8, the same components in FIG. 9 are identified by the same reference numerals as in FIG. 8 and their description is omitted.

When the inflator 112 is activated upon a car crash, the gas is introduced into the airbag 130 through the opening 136, and the airbag 130 pushes the lid 114 out. Then, the airbag 130 inflates into the passenger compartment, and expands from the upper surface of the instrument panel 120 toward the passenger so as to be ready to receive the passenger, as shown in FIG. 9.

The above-described passenger-side airbag 100 is required to expand widely so as to occupy the space among the passenger, the windshield 122, and the instrument panel 120, and is also required to surely receive the passenger. Therefore, the airbag must have a large volume. Various means have been implemented so that an airbag having such a large volume can completely inflate immediately after starting the inflation.

As one of the means, a capacity of the inflator 112 as a gas source for inflating the airbag 100 is increased. However, such an inflator with a large capacity is expensive. In addition, since the airbag and fixtures used for fixing the inflator are subject to a large stress, these components are required to have sufficient strength. Accordingly, this means is not preferable from the viewpoints of a cost, a weight, and so forth.

Alternatively, the passenger surface 102 of the airbag 100 is connected to the periphery of the gas-flow opening 106 formed at the rear part of the airbag fixed to the retainer with a strap or the like so that the inflation of the passenger surface is constrained, thereby reducing the volume of the airbag. Thus, the airbag can inflate completely right after the starting of the inflation even with an inflator having a relatively small capacity.

However, when reducing the volume of the airbag by restricting its inflation, for example, constraining the inflation of the passenger surface as described above, a distance between the passenger surface of the completely expanded airbag and the passenger becomes large.

Also, in the foregoing airbag 100, since three or more panels must be sewed three-dimensionally in order to form the surfaces of the airbag 100, it is quite troublesome and also costly to manufacture. Furthermore, the equipment expenses for manufacturing the airbag 100 are likely to become large.

On the other hand, the foregoing airbag 130 is formed of only two panels, and it can be manufactured by just overlapping the two panels with each other and stitching the peripheries thereof two-dimensionally. As a result, it is very easy to manufacture and the manufacturing cost including the equipment and so forth is small.

However, in the airbag 130 formed of the two panels sewed two-dimensionally together, an outer surface of the airbag 130 can not sufficiently face an inner surface of the passenger compartment such as the windshield 122 when the airbag expands. Therefore, the airbag 130 tends to move in an unstable manner during and after its inflation.

Accordingly, the first object of the present invention is to provide a passenger-side airbag apparatus without the above-described problems, which has a sufficient shock absorption capability and quickly completes its inflation without increasing the capacity of the inflator.

Also, the second object of the present invention is to provide a passenger-side airbag apparatus moving in a stable manner during and after its inflation.

Other objects and advantages of the invention will be apparent from the following description of the invention.

SUMMARY OF THE INVENTION

In a passenger-side airbag apparatus according to the present invention, the passenger-side airbag apparatus has an airbag expanding toward a passenger, wherein the airbag includes the first bag and the second bag. When the airbag apparatus is actuated, gas is introduced into the first bag to inflate the same from the upper portion of an instrument panel of a vehicle toward the passenger. Then, the second bag expands when the gas is introduced into the second bag through the first airbag. The maximum lateral width of the second bag is greater than that of the first bag in an expanded state. The second bag presses an upper portion of a windshield or a ceiling of a passenger compartment of the vehicle when the first and second bags expand. Further, the second bag expands toward the passenger further than the first bag and faces the upper body of the passenger when the first bag and second bag expand completely.

In the passenger-side airbag apparatus according to the present invention, when an inflator is activated in an emergency such as a car crash and the gas from the inflator inflates the first and second bags, only the second bag substantially faces and receives the upper body of the passenger. Since the first bag does not directly come to contact with the passenger, its lateral width can be made small.

Since the lateral width of the first bag is made small as described above, the volume of the whole airbag becomes small, thereby allowing the airbag to quickly complete its inflation without increasing the capacity of the inflator.

According to the present invention, the first bag may be formed such that two panels as an upper half and a lower half of the expanded bag are stitched together two-dimensionally, as shown in the conventional airbag 130. Further, a gas inlet opening or a connecting portion to the retainer is disposed at a rear side of a surface of the lower half. With this structure, the first bag can be manufactured easily at a low cost, and, as a result, the whole airbag can be manufactured relatively easily at a low cost. The conventional airbag 130 has a risk of moving in an unstable manner while it is inflating and after the inflation is completed. On the other hand, the expanded airbag according to the present invention moves in a stable manner since the second bag, which inflates together with the first bag, presses the upper portion of the windshield or the ceiling of the passenger compartment.

BRIEF DESCRIPTION OF THE DRAWINGS

FIGS. 4(a) and 4(b) are the airbag shown in FIG. 1, wherein FIG. 4(a) is a plan view in a flatly unfolded and unexpanded state and FIG. 4(b) is a sectional view taken along line 4(b)—4(b) in FIG. 4(a);

FIG. 5 is a sectional view of a front portion of a vehicle in front of a front passenger seat showing a configuration of a passenger-side airbag apparatus according to another embodiment of the present invention;

DETAILED DESCRIPTION OF THE PREFERRED EMBODIMENTS

Hereunder, embodiments of the present invention will be described with reference to the accompanying drawings.

Figure 1:
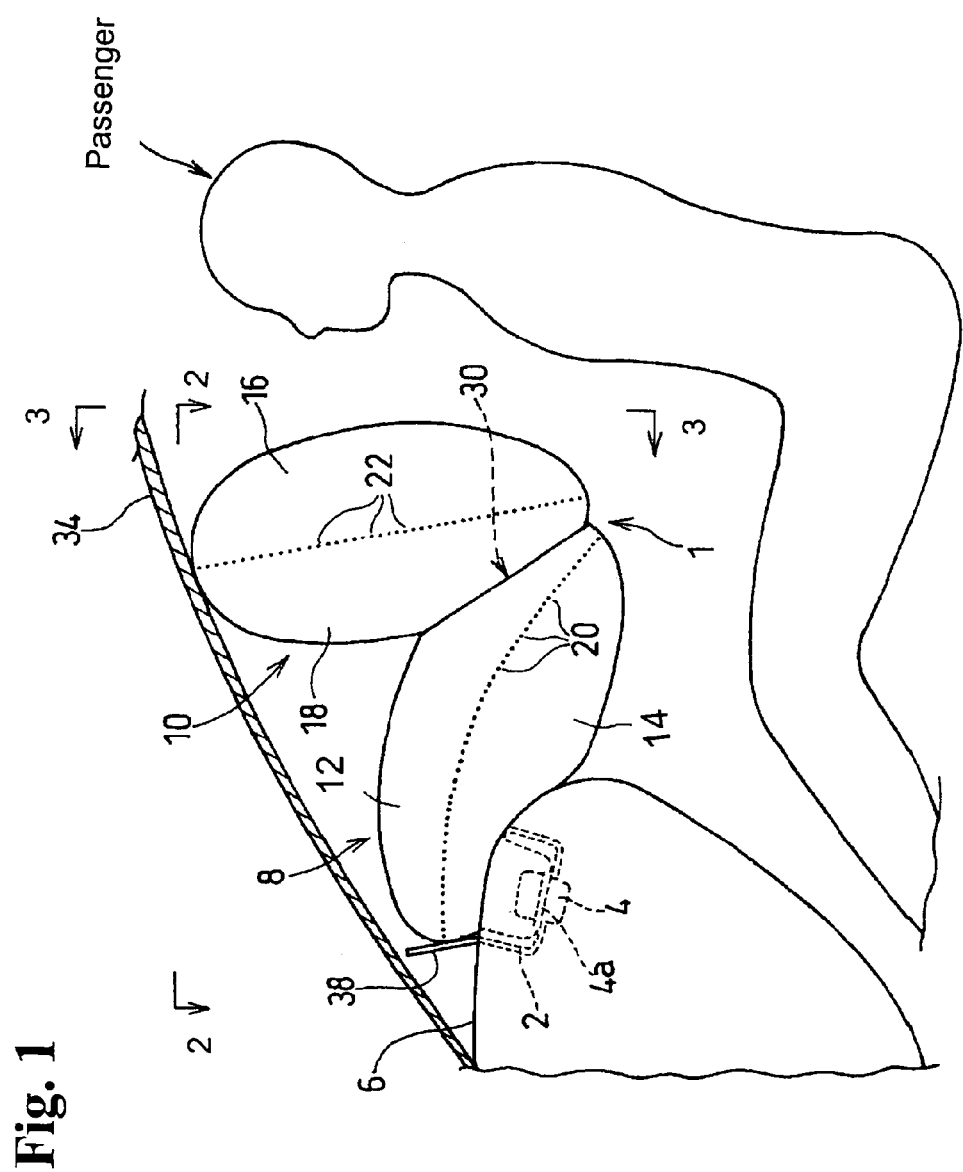
FIG. 1 is a sectional view of a front portion of a vehicle in front of a front passenger seat showing a configuration of a passenger-side airbag apparatus according to an embodiment of the present invention.
Figure 2:
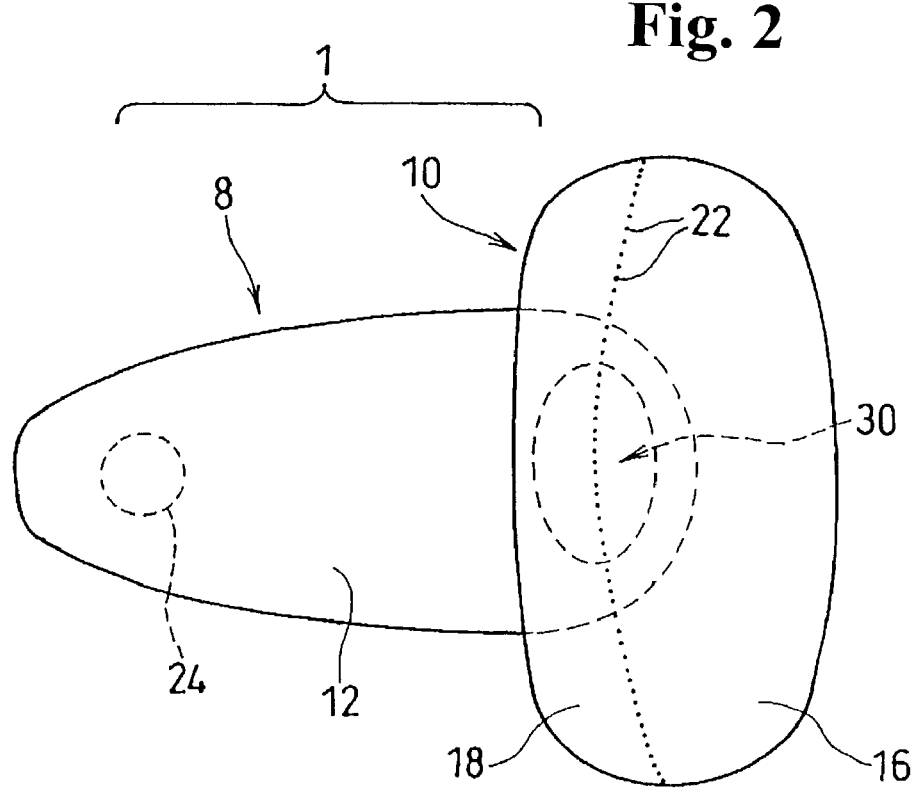
FIG. 2 is a plan view showing an expanded airbag viewed from a plane taken along line 2—2 in FIG. 1.
Figure 3:
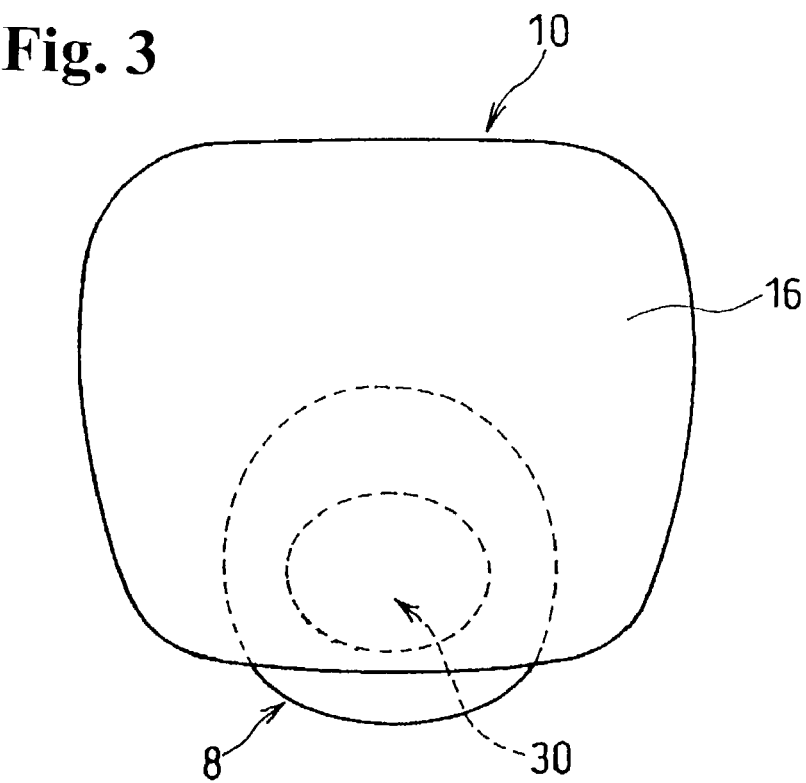
FIG. 3 is a front view of the expanded airbag viewed from a plane taken along line 3—3 in FIG. 1.
Figure 4A:
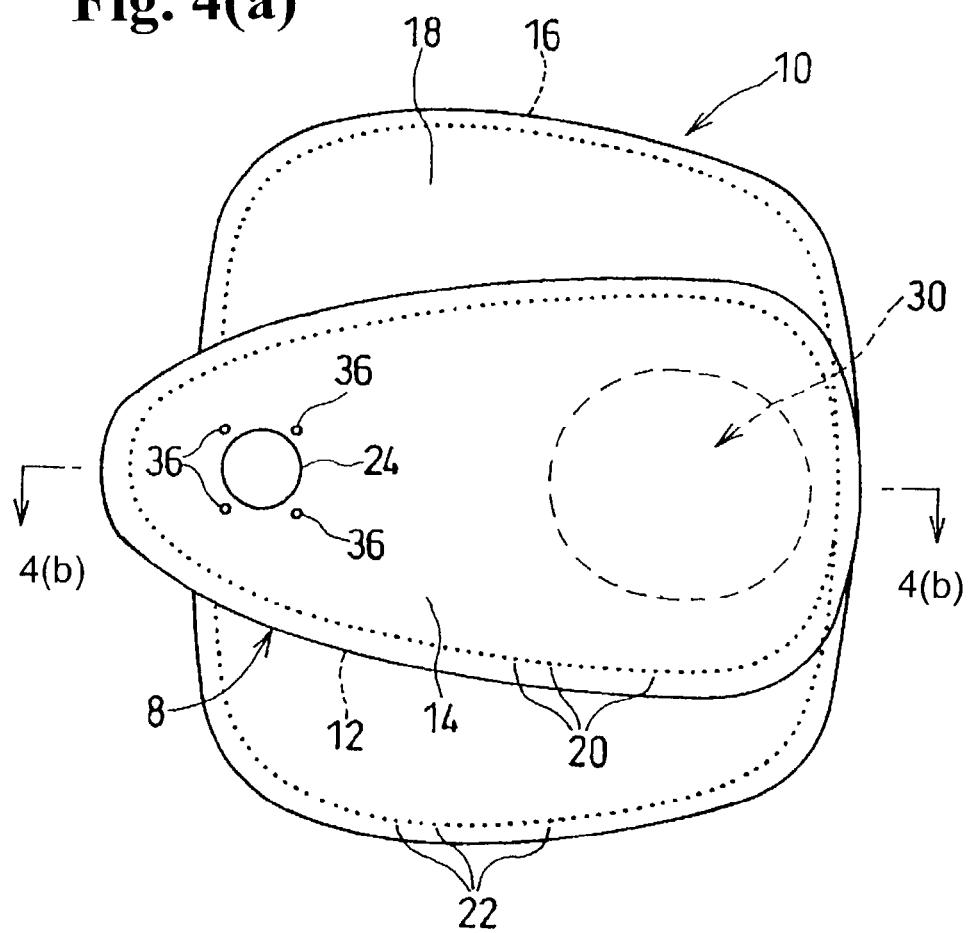
Figure 4B:
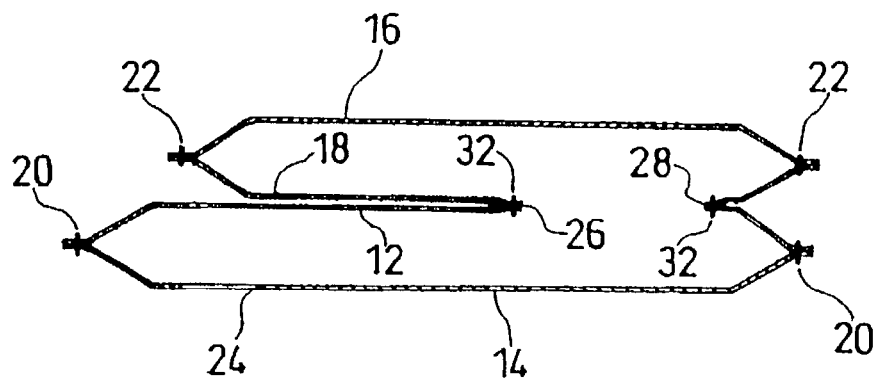

FIG. 1 is a sectional view in front of a front passenger seat of a vehicle showing a configuration of a passenger-side airbag apparatus according to an embodiment of the present invention. FIG. 2 is a plan view showing an expanded airbag viewed from a plane taken along line 2—2 in FIG. 1. FIG. 3 is a front view of the expanded airbag viewed from a plane taken along line 3—3 in FIG. 1. FIGS. 4(a) and 4(b) are the airbag shown in FIG. 1, wherein FIG. 4(a) is a plan view in a flatly unfolded and unexpanded state and FIG. 4(b) is a sectional view taken along line 4(b)—4(b) in FIG. 4(a). In the following description, a front part of the airbag represents a part closer to a passenger, that is, the right side in FIG. 1, and a rear part of the airbag represents a part closer to an instrument panel, that is, the left side in FIG. 1.

The passenger-side airbag apparatus has an airbag 1 capable of expanding toward the passenger, a container-shape retainer 2 having an opening in an upper surface thereof to deploy the airbag, and an inflator 4 for inflating the airbag 1. The retainer 2 is installed in an opening for the airbag apparatus (not shown) formed in an upper portion of an instrument panel 6 in front of the front passenger seat (not shown) of the vehicle. The inflator 4 has a flange 4a projecting from a peripheral side surface thereof. The inflator 4 penetrates the bottom of the retainer 2 and is disposed thereto such that the flange 4a overlaps the bottom.

As shown in FIG. 1, the airbag 1 is connected to the retainer 2 at a rear portion thereof, and has a first bag 8 to expand from an upper surface of the instrument panel 6 toward the passenger and a second bag 10 disposed at a front part of the first bag 8 to expand so as to face the upper body of the passenger.

As shown in FIG. 4(b), the first bag 8 has an upper panel 12 as an upper half thereof and a lower panel 14 as a lower half thereof when the bag expands, so as to form a bag by overlapping these panels with each other and connecting their peripheries by stitching or the like. Also, the second bag 10 has a passenger panel 16 facing the passenger and a rear panel 18 serving as a rear part thereof when it expands, so as to form a bag by overlapping these panels with each other and connecting their peripheries by stitching or the like. In FIGS. 4(a) and 4(b), reference numeral 20 represents an attaching or bonding line that bonds the upper panel 12 and the lower panel 14, and reference numeral 22 represents an attaching or bonding line that bonds the passenger panel 16 and the rear panel 18.

The lower panel 14 has an opening 24 at a rear part thereof for introducing the gas from the inflator 4 into the first bag 8. Also, the upper panel 12 has an opening 26 at a front part thereof for allowing the gas introduced in the first bag to flow into the second bag 10. The rear panel 18 has a gas-flow opening 28 at a lower portion thereof corresponding to the opening 26.

By connecting or bonding the front part of the upper panel 12 and the lower portion of the rear panel 18 along the peripheries of these openings 26 and 28 by stitching or the like, the first bag 8 and the second bag 10 are connected to each other. Also, by connecting or bonding the peripheries of the openings 26 and 28 with each other, a gas-flow port 30 for allowing the gas to flow between the first bag 8 and the second bag 10 is also formed. In FIG. 4(b), reference numeral 32 represents a bonding line, which is formed along the peripheries of the openings 26, 28 and bonds the upper panel 12 and the rear panel 18.

Figure 10:
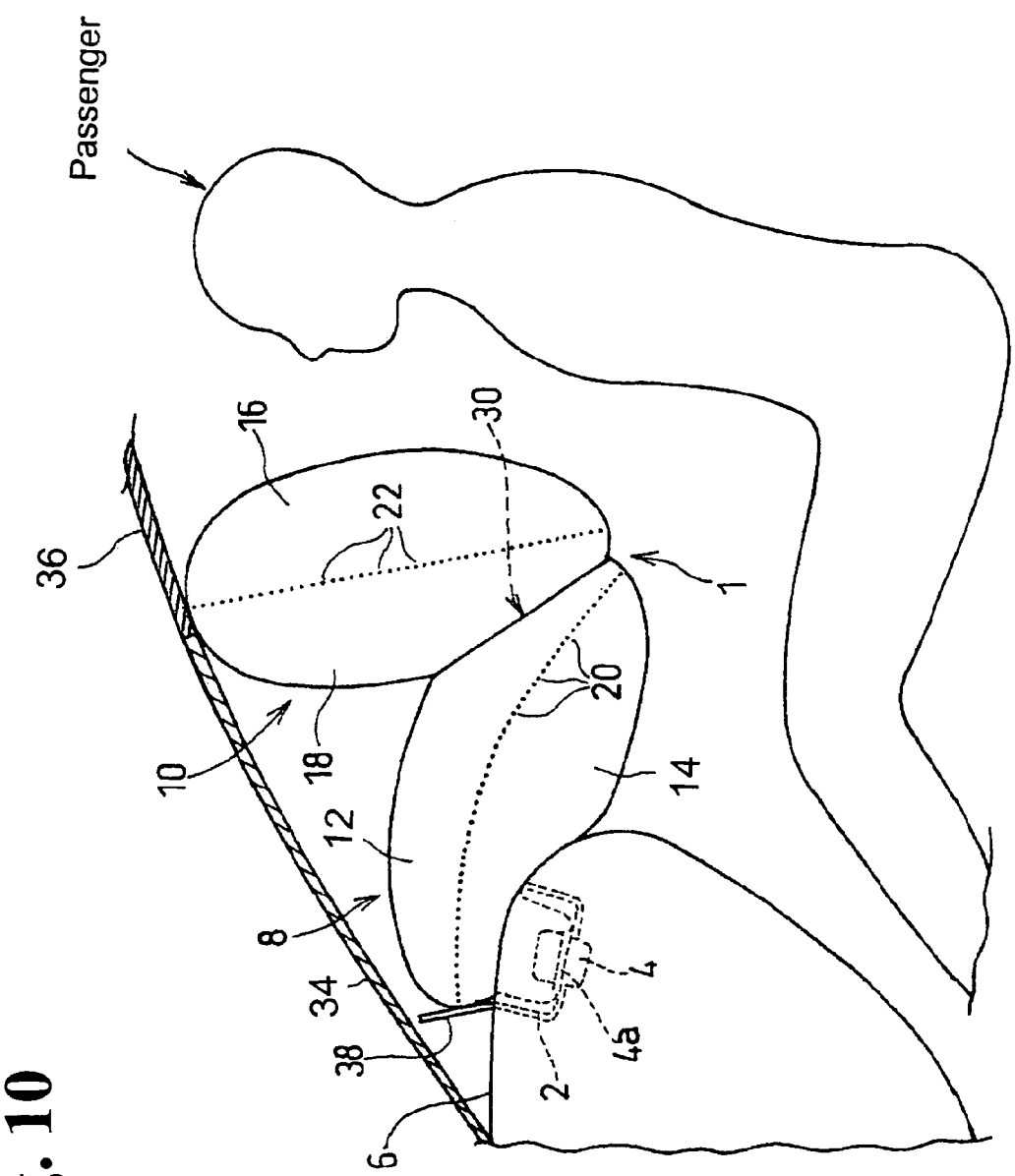
FIG. 10 is a sectional view, similar to FIG. 1, for schematically showing a further embodiment of a passenger-side airbag apparatus according to the invention.

In the airbag 1, as shown in FIG. 4(a), lengths of the upper panel 12 and the lower panel 14 of the first bag 8 in the lateral width direction are smaller than those of the passenger panel 16 and the rear panel 18 of the second bag 10 in the lateral width direction. The passenger panel 16 and the rear panel 18 have lengths in the vertical direction such that at least one of the upper portions thereof abuts against a windshield 34 or a ceiling 36 (FIG. 10) of the passenger compartment when the second bag 10 expands. Note that the lateral width direction of the first bag 8 is shown as the vertical direction in FIG. 4(a), and the lateral width direction and the height direction of the second bag 10 are respectively shown as the vertical and horizontal directions in the figure.

The first bag 8 is connected to the retainer 2 such that the periphery of the gas-inflow opening 24 of the lower panel 14 is clamped between the flange 4a of the inflator 4 and the bottom of the retainer 2. These parts are integrally fixed by through-holes 36 (shown in FIG. 4(a)), formed for inserting bolts, rivets, or the like around the periphery of the opening 24 of the lower panel 14, and fixtures (not shown) such as bolts, rivets, or the like so as to pass through both the flange 4a and the bottom of the retainer 2.

In the passenger-side airbag apparatus having the above-described structure, in a normal situation, the airbag 1 is housed in the retainer 2 in a folded state and the opening disposed in the upper surface of the retainer 2 is closed by a lid 38 fixed to the retainer 2 so as to be substantially flush with the upper surface of the instrument panel 6.

In an emergency such as a car crash, the inflator 4 is activated and the gas is introduced from the inflator 4 into the airbag 1. The introduced gas causes the airbag 1 to push the lid 38 out, to inflate into the passenger compartment, and to expand into a space between the passenger and the instrument panel 6.

Since the gas from the inflator 4 is first introduced into the first bag 8 through the opening 24, firstly, the first bag 8 of the airbag 1 expands from the upper surface of the instrument panel 6 toward the passenger. Then, the gas flows into the second bag 10 from the gas-flow port 30 via the first bag 8, thus causing the second bag 10 to expand so as to face the upper body of the passenger.

In the airbag 1, since the lengths of the upper panel 12 and the lower panel 14 of the first bag 8 in the lateral width direction are made small, the volume of the first bag 8 becomes small and the whole volume of the airbag 1 becomes small correspondingly. With this structure, the airbag 1 quickly completes its inflation even when the inflator 4 does not have a very large capacity.

In the airbag 1, when the first bag 8 and the second bag 10 inflate, only the second bag 10 disposed at the front part of the first bag 8 substantially faces and receives the upper body of the passenger, thereby allowing the first bag 8 to have a small width.

In this embodiment, the first bag 8 has the upper panel 12 and the lower panel 14, which are two-dimensionally stitched together, and has a structure in which the periphery of the gas-inflow opening 24 formed at the rear part of the lower panel 14 is connected to the retainer 2. The conventional airbag 130 described above has a risk of unstable movement during and after its inflation. However, in the airbag 1, since the second bag 10, which inflates following the inflation of the first bag 8, abuts against the upper portion of the windshield 34 or the ceiling of the passenger compartment so as to support the airbag, the fully expanded airbag 1 becomes stable and accordingly can securely receive the passenger.

Figure 6:
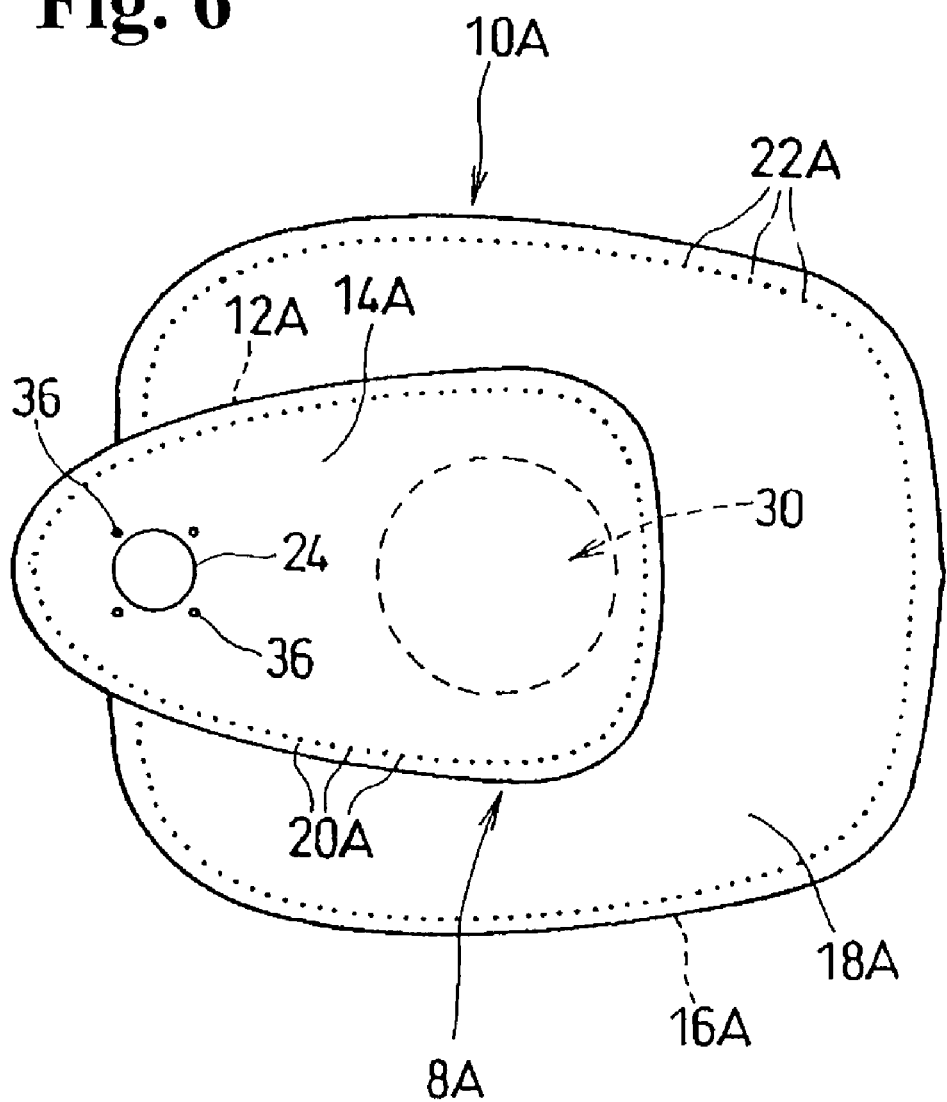
FIG. 6 is a plan view showing the airbag in FIG. 5 in a flatly unfolded and unexpanded state.

FIG. 5 is a sectional view of a front portion of a vehicle in front of the front passenger seat, illustrating a configuration of a passenger-side airbag apparatus, having a completely expanded airbag, according to another embodiment of the present invention. FIG. 6 is a plan view of the airbag flatly unfolded in a non-expanded state.

In an airbag 1A, as shown in FIG. 6, lower portions of a passenger panel 16A and a rear panel 18A of the second bag 10A extend downwardly (in FIG. 6, the height direction of the second bag 10A is shown as the horizontal direction and the downward direction corresponds to the right direction in the figure) further than the passenger panel 16 and the rear panel 18 of the second bag 10 according to the previous embodiment. Thus, the second bag 10A is designed to abut against legs of the passenger when it expands, and the second bag 10A has an additional volume corresponding to the extended part.

On the other hand, an upper panel 12A and a lower panel 14A of the first bag 8A have lengths smaller than those of the upper panel 12 and the lower panel 14 of the first bag 8 according to the previous embodiment in the lateral width direction (in FIG. 6, the lateral width direction of the first bag 8A is shown as the vertical direction), thereby allowing the first bag 8A to have a small volume.

In FIGS. 5 and 6, reference numeral 20A represents a connecting or bonding line that bonds the upper panel 12A and the lower panel 14A, and reference numeral 22A represents a connecting or bonding line that bonds the passenger panel 16A and the rear panel 18A.

Since the other configuration of the airbag apparatus having the airbag 1A is the same as that of the above-described airbag apparatus shown in FIGS. 1 to 4, the same components in FIGS. 5 and 6 are represented by the same reference numerals as those in FIGS. 1 to 4 and their description is omitted.

In this passenger-side airbag apparatus, even though the second bag 10A has a relatively large volume, the first bag 8A has a small volume corresponding thereto, thereby allowing the airbag 1A to have a small volume as a whole. With this structure, the airbag 1A quickly completes its inflation even when the inflator 4 does not have a very large capacity, in the same fashion as the airbag 1 according to the previous embodiment.

Also, when the airbag 1A expands completely, the expanded airbag 1A abuts against the thighs of the passenger at the lower portion thereof, and the upper portion thereof abuts against the windshield 34 or the ceiling of the passenger compartment. Therefore, a position of the air bag is securely stabilized.

In each of the passenger-side airbag apparatuses according to the present invention, it is possible to control an inflating action of the second bag, if necessary, by adjusting an amount of gas flowing into the second bag via the first bag or a direction of gas-flow by varying an area or a shape of the gas-flow port disposed between the first bag and the second bag.

Figure 7:
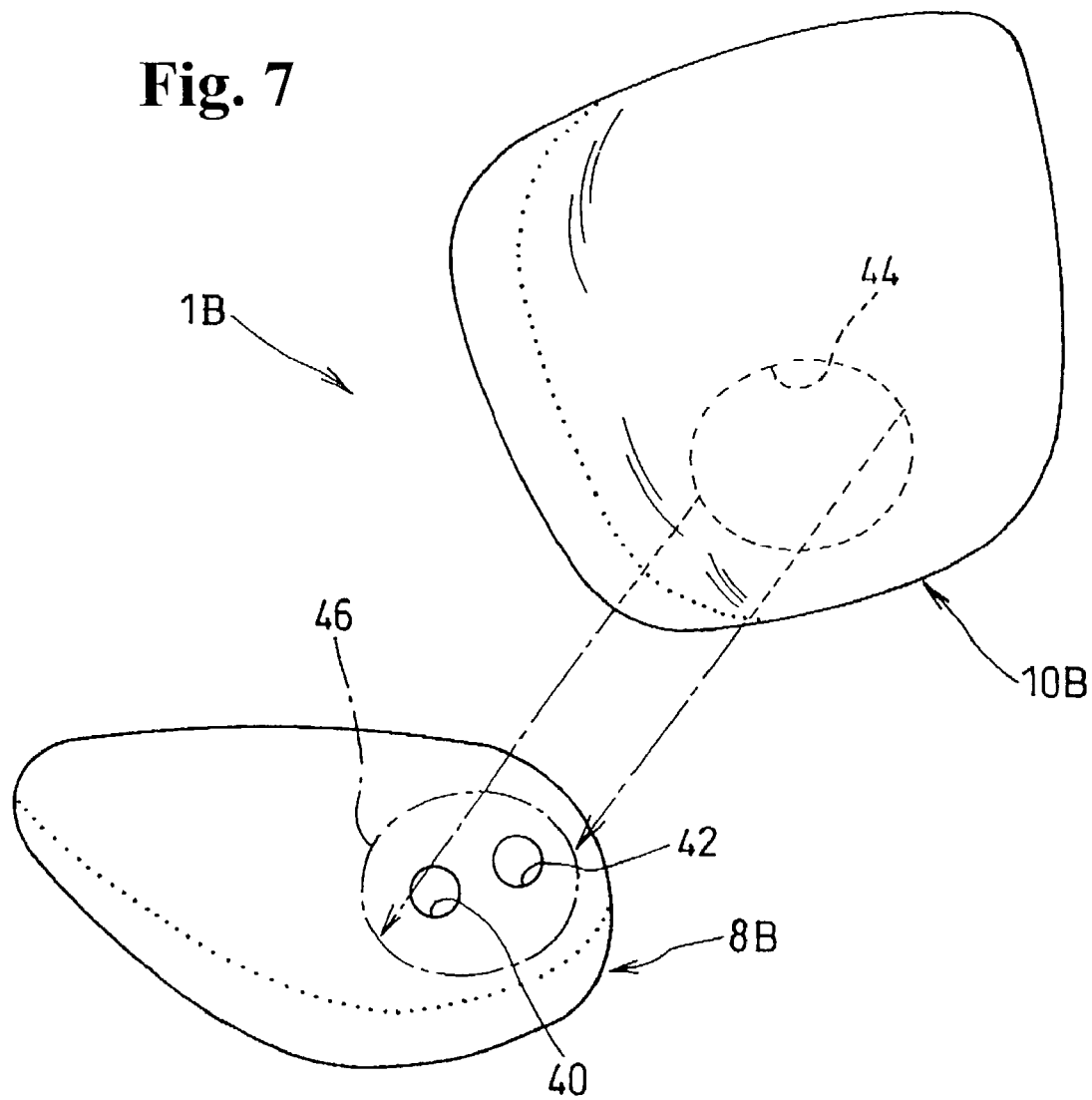
FIG. 7 is an exploded perspective view showing an airbag according to another embodiment of the present invention.
Figure 8:
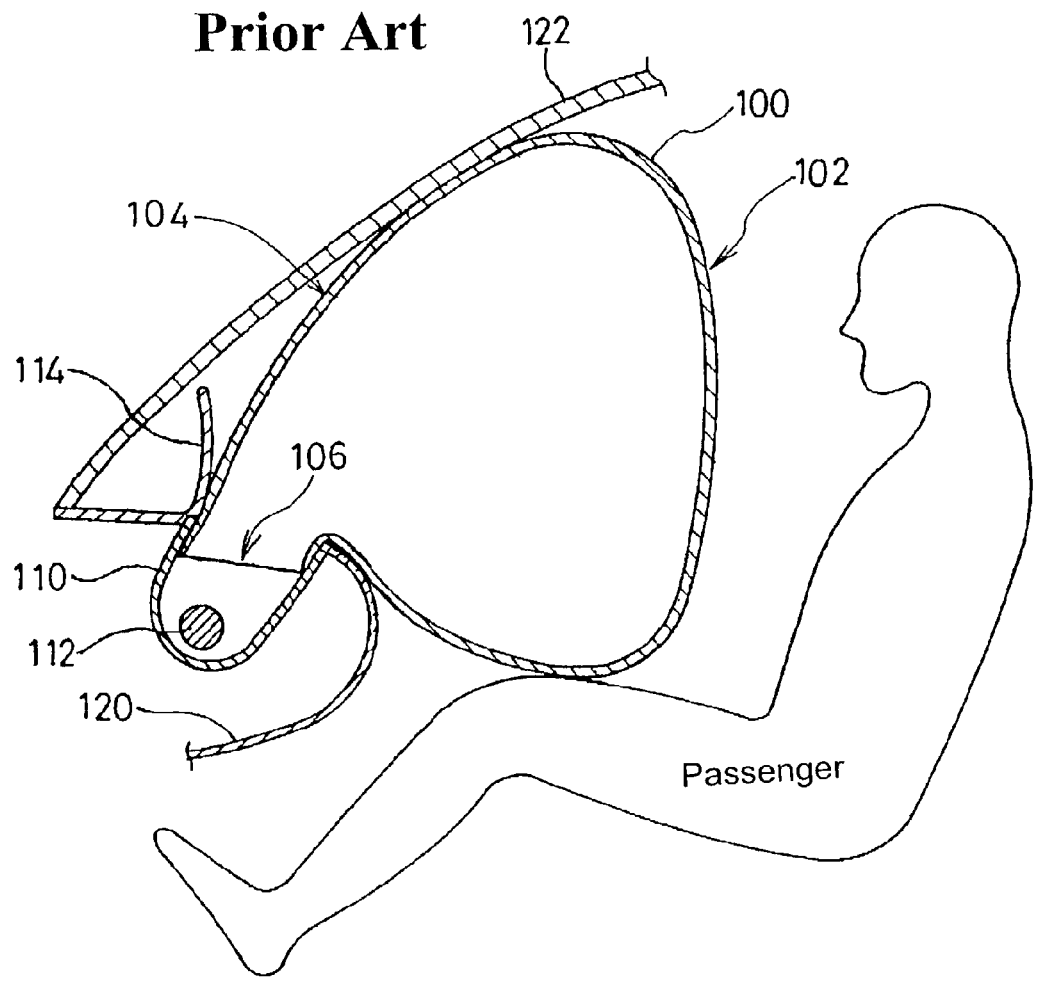
FIG. 8 is a sectional view of a front portion of a vehicle in front of a front passenger seat showing a configuration of a conventional passenger-side airbag apparatus.
Figure 9:
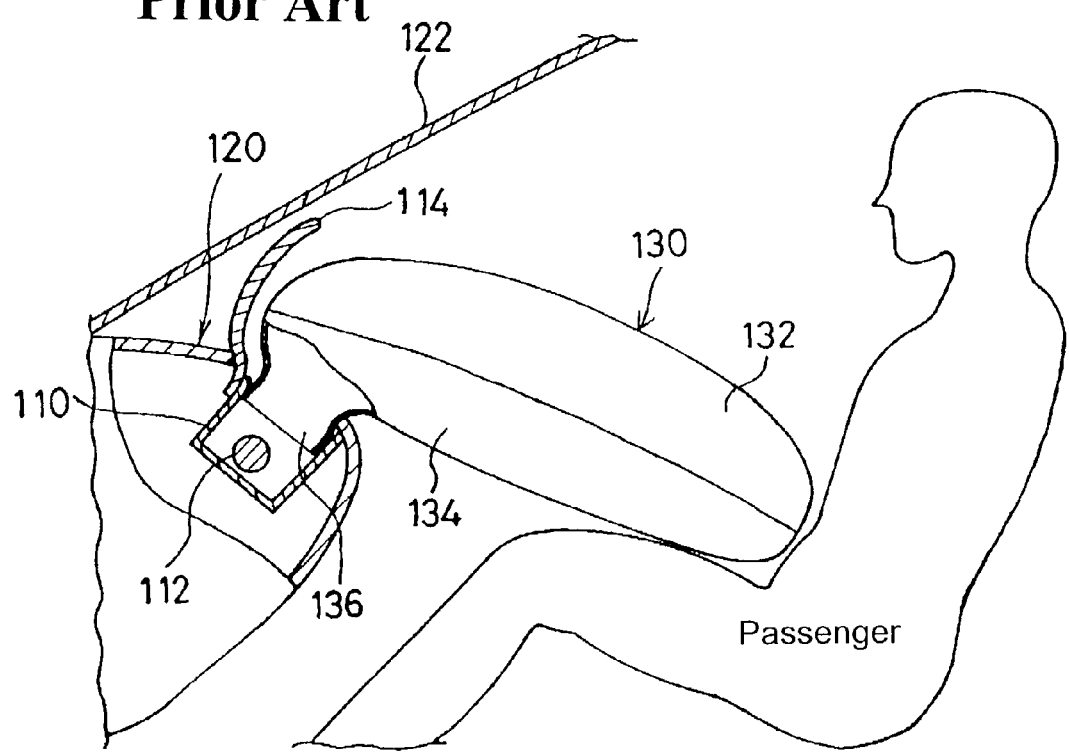
FIG. 9 is a sectional view of a front portion of a vehicle in front of a front passenger seat, for illustrating the configuration of another conventional passenger-side airbag apparatus.

For example, in an airbag 1B shown in FIG. 7, the first bag 8B has two gas-flow openings 40 and 42 having relatively small diameters at a front part thereof, and the second bag 10B has a gas-flow opening 44 having a size for encircling these openings 40 and 42 at a lower portion of the rear surface thereof. The second bag 10B is bonded to the front part of the first bag 8B along a bonding line 46 by stitching or the like, such that the periphery of the opening 44 encircles the openings 40 and 42.

In the airbag 1B having such a structure, the gas flowing into the second bag 10B via the first bag 8B is blocked by the relatively small openings 40 and 42, thereby allowing the airbag 1B to gently expand toward the passenger as a whole. In addition, the gas flows into the second bag 10B in a divided manner by passing through these two openings 40 and 42, thereby allowing the second bag 10B to inflate very smoothly.

In each of the above-described embodiments, since each pair of the panels can be stitched by a relatively simple two-dimensionally stitching machine, the airbag can be manufactured relatively easily and also at a low cost. In addition, the investment for equipment for manufacturing the airbags can be made relatively small.

As described above, the present invention provides a passenger-side airbag apparatus having an airbag with a sufficient shock-absorbing performance when the airbag expands, quickly completing its inflation without increasing a capacity of an inflator, and operating stably during and after its inflation.

While the invention has been explained with reference to the specific embodiments of the invention, the explanation is illustrative and the invention is limited only by the appended claims.

What is claimed is:

1. A passenger-side airbag apparatus for protecting a passenger in a vehicle, comprising:
an inflator for generating gas adapted to be attached to an upper portion of an instrument panel,
a first bag having a first opening at a rear side thereof connected to the inflator for receiving the gas from the inflator and a second opening at a front side and opposite to the rear side, and
a second bag connected to the second opening of the first bag at the front side thereof for receiving the gas through the first bag to expand upwardly from the first bag, and having a maximum lateral width greater than that of the first bag, said second bag having a lower portion connected to the front side of the first bag so that the second bag extends upwardly from the front side of the first bag and the front side of the first bag supports the passenger together with the second bag when the first and second bags expand, and a size to abut against one of a windshield and an inside ceiling of the vehicle when the first and second bags fully expand so that the second bag receives an upper body of the passenger when the first and second bags fully expand.

2. A passenger-side airbag apparatus according to claim 1, wherein said first bag is connected to the second bag through a plurality of openings.

3. A passenger-side airbag apparatus according to claim 1, wherein said first opening is formed at a lower portion of the first bag, and said second opening is formed at an upper portion of the first bag opposite to the lower portion.

4. A passenger-side airbag apparatus according to claim 3, wherein said second bag is attached to the first bag obliquely.

5. A passenger-side airbag apparatus according to claim 4, wherein said second bag expands substantially upwardly relative to the first bag without expanding downwardly.

6. A passenger-side airbag apparatus for protecting a passenger in a vehicle, comprising:
an inflator for generating gas adapted to be attached to an upper portion of an instrument panel,
a first bag connected to the inflator for receiving the gas from the inflator to expand, said first bag having upper and lower portions, a first opening formed in the lower portion at a rear side thereof and connected to the inflator, and a second opening formed in the upper portion and at a front side opposite to the rear side, and
a second bag connected to the second opening of the first bag for receiving the gas through the first bag to expand, and having a maximum lateral width greater than that of the first bag, said second bag being located at the front side of the first bag so that the front side of the first bag supports the passenger together with the second bag when the first and second bags expand and having a size to abut against one of a windshield and an inside ceiling of the vehicle when the first and second bags fully expand so that the second bag receives an upper body of the passenger when the first and second bags fully expand, said second bag having a lower portion connected to the front side of the first bag so that the second bag extends upwardly from the front side of the first bag when the first and second bags expand.

7. A passenger-side airbag apparatus according to claim 6, wherein each said first and second bags is formed of two panels.

8. A passenger-side airbag apparatus according to claim 6, wherein said first bag is connected to the second bag through a plurality of openings.

9. A passenger-side airbag apparatus for protecting a passenger in a vehicle, comprising:
an inflator for generating gas adapted to be attached to an upper portion of an instrument panel,
a first bag connected to the inflator for receiving the gas from the inflator to expand, said first bag having upper and lower portions, a first opening formed in the lower portion at a rear side thereof and connected to the inflator, and a second opening formed in the upper portion and at a front side opposite to the rear side, and a second bag attached to the first bag obliquely and connected to the second opening of the first bag for receiving the gas through the first bag to expand, and having a maximum lateral width greater than that of the first bag, said second bag being located at the front side of the first bag so that the front side of the first bag supports the passenger together with the second bag when the first and second bags expand and having a size to abut against one of a windshield and an inside ceiling of the vehicle when the first and second bags fully expand so that the second bag receives an upper body of the passenger when the first and second bags fully expand, said second bag expanding substantially upwardly relative to the first bag without expanding downwardly.

* * * * *